Jan. 23, 1940.  E. J. WINKLEMAN  2,187,923
RESILIENT CONNECTION
Filed July 29, 1937  2 Sheets-Sheet 1
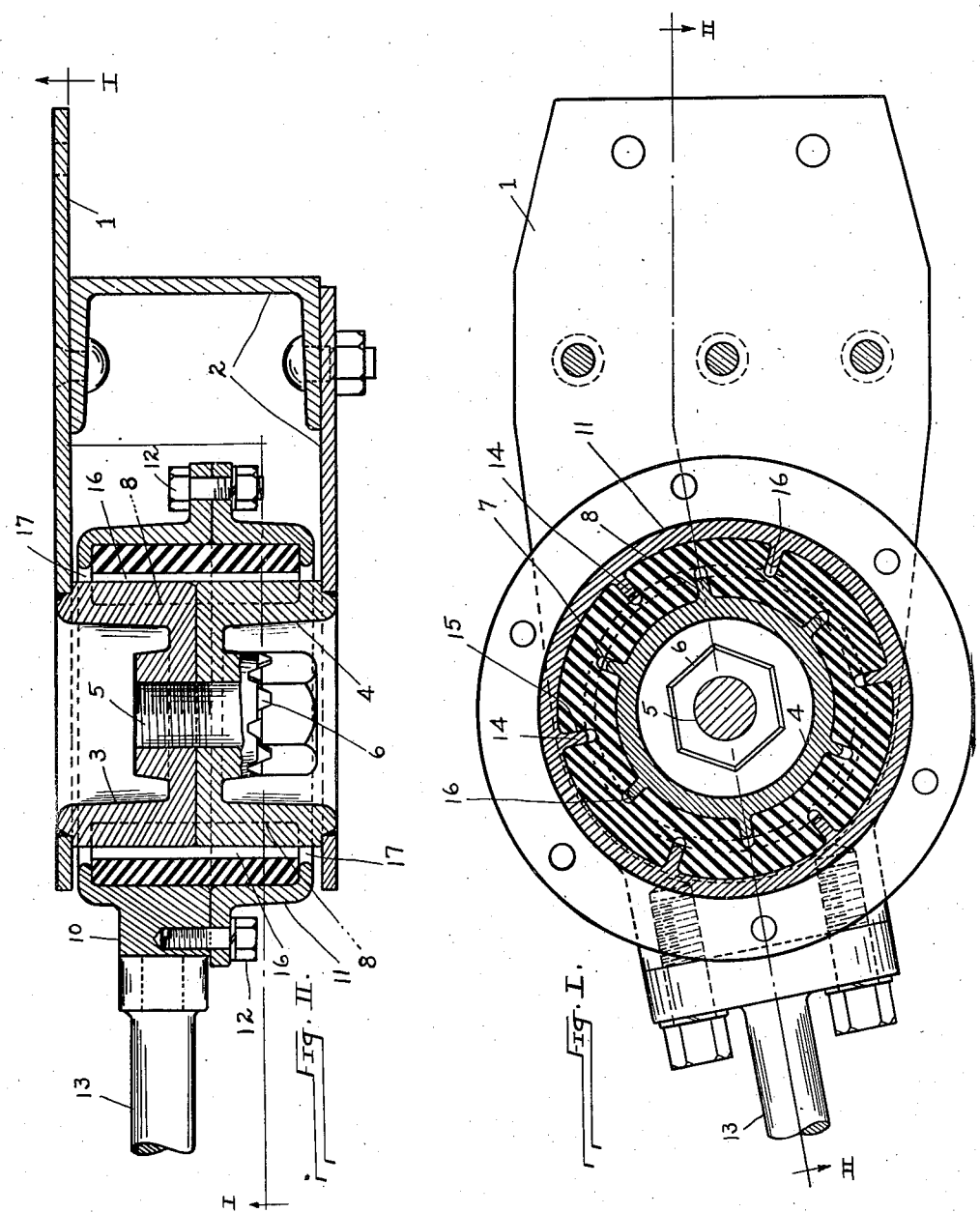
INVENTOR
Edward J. Winkleman
BY Christy and Wharton
ATTORNEYS Jan. 23, 1940.  E. J. WINKLEMAN  2,187,923
RESILIENT CONNECTION
Filed July 29, 1937  2 Sheets—Sheet 2
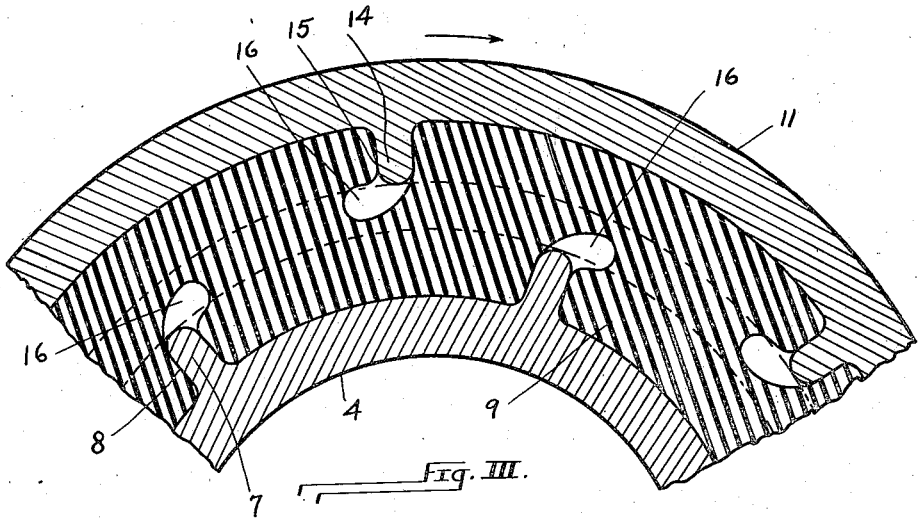
Fig. III.
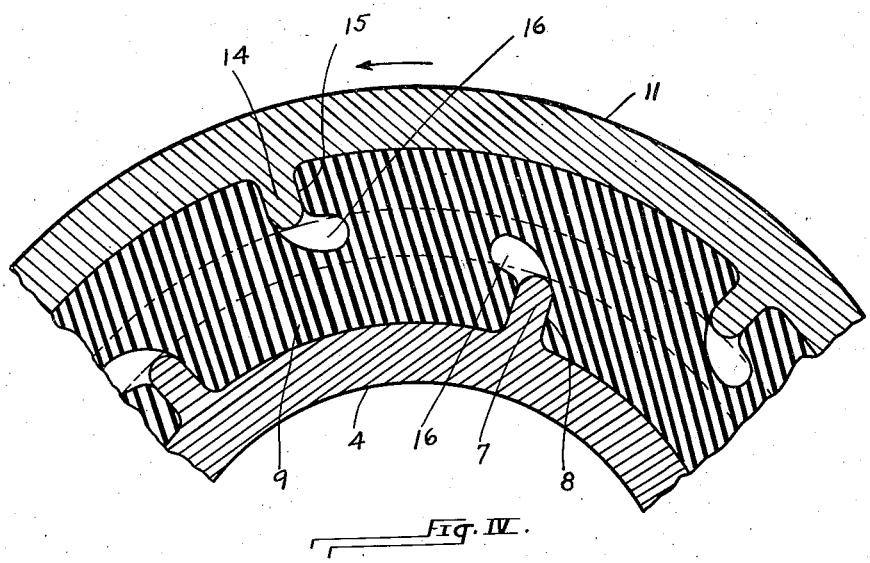
Fig. IV.
INVENTOR.
Edward J. Winkleman
BY Christy and Wharton
ATTORNEYS.

Patented Jan. 23, 1940

2,187,923

UNITED STATES PATENT OFFICE 2,187,923

RESILIENT CONNECTION

Edward J. Winkleman, Oakmont, Pa., assignor of forty-nine per cent to Duquesne Slag Products Company, a corporation of Pennsylvania Application July 29, 1937, Serial No. 156,320

2 Claims. (Cl. 287—85)

This invention relates to a resilient connection of the sort which transmits movement by deformation of a body of rubber, or like resilient compressible material, interposed between a fixed member and a driven member.

Substantial advantage is derived from the use of connections of this sort in machinery where limited movement is to be transmitted. This is because connections of this sort lessen vibration, and are not subject to deterioration by abrasion and friction. They are, however, destructible in that they depend upon the life of a body of resilient material, which in service is subjected to repeated deformations. There is thus a tendency for the resilient bodies to be destroyed by tearing along lines at which the effects of compression and tension are concentrated, and there is also a tendency for the material of the bodies to tear in their regions of attachment to the elements which they yieldingly connect.

In making resilient connections it is therefore important to provide relief within a deformable body of resilient material by spaces into which the resilient material of the body may regionally expand. My invention resides in providing such attachment of the resilient material of a connection of this sort to the members which it connects, and such relief within the body of the material, that a maximum life of the resilient material under given conditions of use is obtained.

My invention is applicable to resilient connections generally, and may be embodied in resilient connections adapted to transmit limited movement in any direction. Also it may find embodiment in a structure in which a fixed and a movable element are resiliently interconnected, or in a structure in which two elements, both movable with respect to a fixed body or plane, are resiliently interconnected. It may also be used in a resilient cushion for mounting bodies subjected to intentional or incidental vibratory movement, or other movement.

In its illustrated embodiment my invention is shown in the form of a resilient center connection, in which limited angular movement of one element is had about another element representing a fixed center.

In the accompanying drawings Fig. I is a cross-sectional view, taken on the plane of the section line I—I of Fig. II, showing the resilient element of a resilient center, and the elements interconnected by it.

Fig. II is a horizontal sectional view, taken on the plane of the section line II—II of Fig. I, showing the complete assembly shown also in Fig. I.

Fig. III is a fragmentary, cross-sectional view on an enlarged scale, functionally illustrative of deformation of the resilient connecting material of the center in angular movement in one direction of the outer element connected by the body of resilient material.

Fig. IV is a similar view, functionally illustrative of deformation of the resilient element of the center in angular movement of the outer connected member in a direction opposite to that shown in Fig. III.

In the accompanying drawings the resilient center is shown attached to a movable element 1, to which there is secured a bracket 2 for rigidly attaching an element of the resilient center. The fixed element of the resilient center shown in the drawings includes two annular members 3 and 4, which lie against each other and which are held together by a bolt 5 and lock washer 6. These members 3 and 4 are shown as welded respectively to the structural element 1 and to the bracket 2. Exteriorly arranged on members 3 and 4 are longitudinal projections which are aligned to form ribs 7. These ribs 7 are designed to enter longitudinal grooves 8 in the bore of a body 9 of resilient material. The relation of the ribs 7 and grooves 8, and the functional effect of their relationship, will be explained in considering the structure and function of the apparatus as a whole.

The resilient body 9 is surrounded by members 10 and 11, which contact along a transverse line, and are held together by cap screws 12. Of these members the member 10 is continuous with an operating rod 13. Interiorly of the embracing members 10 and 11 are longitudinal projections which cooperate to form longitudinal ribs 14 arranged to enter exteriorly located longitudinal grooves 15 in the annular block 9. The members 10 and 11, forming the movable element of the center, are thus cooperative with the annular block 9 in the same manner as the fixed, interiorly located, element formed by the members 3 and 4.

The ribs 7 and 14 of the structure, carried respectively by the fixed and movable elements, are staggered to enter in assembly the relatively staggered interior grooves 8 and exterior grooves 15 of the resilient body 9. The dimensions of the ribs and grooves are such that the ribs extend only part-way of the depth of the grooves, leaving longitudinally extended spaces 16 at the bottom of each groove and beyond the edge of the rib which it accommodates.

In Fig. II of the drawings it will be seen that the structural elements 1 and 2, and the fixed and movable elements 10 and 11 of the resilient connection, do not wholly enclose the resilient element 9, but that they are formed to provide gaps 17, which serve as ports providing the spaces 16 at the bottom of the grooves with openings to the atmosphere. In the assembly, angular movement of the exterior element relatively to the interior element of the assembly is effected wholly by internal deformation of the resilient element 9, and considerable heat is generated by the internal friction resulting from the recurrent deformations. It is therefore of great advantage that the spaces 16 at the bottom of the grooves serve as channels by which air may pass through the block, tending to dissipate the heat thus generated. To this effect the element 9 itself contributes, because its internal deformations, by recurrently changing the shape and cross-section of the spaces 16, cause inspiration and expiration of air, thus creating an active cooling circulation.

The arrangement by which the resilient member 9 engages with the elements which it interconnects provides a maximum of relief for a given volume of resilient material deleted from the body, and provides a construction superior to that provided by perforations extended from end to end of the resilient member. Figs. III and IV illustrate the manner in which the rib and groove connection which has been described relieves the resilient member in its recurrent deformation.

Referring to Fig. III of the drawings, we there see the condition existing in the resilient element 9, as the outer element is moved in clockwise direction. In movement, ribs 14 on the outer element play an active part, while the ribs 7 on the inner element play a passive part. Each of the ribs 14 is therefore functionally opposed in the resilient body 9 by the ribs 7 which lie ahead and by the ribs 7 which lie rearwardly in the direction of movement. If relief were not provided, there would be a tendency for the rubber to tear away from the ribs 7 and 14 of the resiliently connected elements, and also there would be a concentration of force tending to tear the rubber along lines extending between the ribs of the connected elements.

As shown, however, those spaces 16 which lie at the bottom of grooves 15, occupied by ribs 14, tend to spread rearwardly in zones lying radially inward of the ribs, under tension and compression caused by progress of the ribs. Those spaces 16, which lie at the bottom of grooves 8 occupied by ribs 7, spread in the direction of movement as the body of the block is pushed and pulled regionally past the ribs. The relief cooperatively provided by the spaces, or channels 16, thus serves to distribute the shearing forces over a relatively wide area, thus preventing a rapidly destructive shear effect anywhere in the resilient body.

Fig. IV of the drawings illustrates the effect of a counter-clockwise movement. In this view the spaces are shown spread in a direction opposite to that in which they are in Fig. III, since the forces causing alternate compression and tension in the areas between ribs have been reversed. The effect is, however, identical with the effect shown in Fig. III, insofar as the resilient body as a whole is concerned.

There is, in the structure described, relative movement between the ribs of the assembly and the walls of the grooves in which they lie during relative movement of the elements about their common center. This minimizes the tearing effect of the ribs on the material with which they are in actual contact, as some ribs move by virtue of deformation of the resilient material, and as the resilient material, in accommodation to such movement, deforms itself about both the moving and the static ribs.

In fact any resilient center of this general sort constitutes a specialized machine element, and it is to improvement of such machine element that my invention relates. Having experimented with resilient centers having solid rubber blocks, and others provided with a concentric ring of perforations, I have found that a resilient center made in accordance with this present invention has, under identical conditions of service, a useful life many times that of the best other form which I have tried.

As shown, the rubber block 9 is embraced between end flanges on the members 2 and 3 and the members 10 and 11, and is thus centered in its mounting. This centering may be effected in various other ways, as by means of a circumferential rib, or ribs, on one or both of the fixed element and the movable element of the assembly. Numerous other modifications in the form and arrangement of the resilient center of my invention may be made without departing from the scope of my invention as defined in the appended claims.

The embodiment of my invention herein shown and described is of a resilient center adapted to the transmission of angular movement. As indicated above, however, the same principles by which adequate connection of relatively rigid elements to a resilient element, and relief of the resilient element is provided, are applicable to the transmission of movements other than angular, and even to the transmission of straight-line movement. While I prefer to use for the resilient element of the connection rubber, or such compositions, or synthetic products as are commonly designated by the term "rubber," other resilient deformable materials of generally like sort may be used.

I claim as my invention:

1. In a resilient connection comprising in combination two relatively movable rigid elements and a resilient body confined between the two said elements, said resilient body being connected to both the said rigid elements by means of depressions in the said resilient body and projections on the rigid elements extended into the depressions, the said projections being less than half the thickness of the resilient body, so that relative movement of the two rigid elements is accompanied by the creation of tension in an intermediate zone of the resilient body; the arrangement providing relief for the resilient body by diminishing the concentration of tensile stresses at the ends of the said projections which consists of a proportioning of the said projections and depressions such that the projections extend into the said depressions a distance less than the depth thereof to leave in the resilient body free spaces adjacent the ends of the said projections.

2. In a resilient connection comprising in combination two relatively movable rigid elements and a resilient body confined between the two said elements, said resilient body being connected to both the said rigid elements by means of grooves in the said resilient body and projections on the rigid elements extended into the grooves, the said projections being less than half the thickness of the resilient body, so that relative movement of the two rigid elements is accompanied by the creation of tension in an intermediate zone of the resilient body; the arrangement providing relief for the resilient body by diminishing the concentration of tensile stresses at the ends of the said projections which consists of a proportioning of the said projections and grooves such that the projections extend into the said grooves a distance less than the depth thereof, to leave in the resilient body free spaces adjacent the ends of the said projections, at least some of the said grooves of the resilient body being in communication at one end at least thereof with the atmosphere.

EDWARD J. WINKLEMAN.